(12) United States Patent
Cooper et al.

(10) Patent No.: US 6,815,105 B2
(45) Date of Patent: Nov. 9, 2004

(54) FUEL CELL APPARATUS AND METHOD THEREOF

(75) Inventors: John F. Cooper, Oakland, CA (US);
Roger Krueger, Ripon, CA (US);
Nerine Cherepy, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 279 days.

(21) Appl. No.: 09/970,283

(22) Filed: Sep. 27, 2001

(65) Prior Publication Data

US 2002/0106549 A1 Aug. 8, 2002

Related U.S. Application Data

(60) Provisional application No. 60/242,771, filed on Oct. 23, 2000.

(51) Int. Cl.[7] .......................... H01M 8/14; H01M 6/20; H00M 4/58
(52) U.S. Cl. ....................... 429/16; 429/103; 429/231.8; 204/243.1
(58) Field of Search ................... 429/101, 102, 429/103, 16, 231.8; 204/243.1

(56) References Cited

U.S. PATENT DOCUMENTS 3,988,163 A * 10/1976 Sklarchuk .................. 429/103
6,200,697 B1    3/2001 Pesavento ..................... 429/28

FOREIGN PATENT DOCUMENTS

JP          10-199533        * 7/1998

* cited by examiner

Primary Examiner—Patrick Ryan
Assistant Examiner—Thomas H. Parsons
(74) Attorney, Agent, or Firm—Ann M. Lee; Alan H. Thompson; Eddie E. Scott (57) ABSTRACT

Highly efficient carbon fuels, exemplary embodiments of a high temperature, molten electrolyte electrochemical cell are capable of directly converting ash-free carbon fuel to electrical energy. Ash-free, turbostratic carbon particles perform at high efficiencies in certain direct carbon conversion cells.

77 Claims, 5 Drawing Sheets

FUEL CELL APPARATUS AND METHOD THEREOF

RELATED APPLICATION

This application is related to Provisional Application No. 60/242,771 filed Oct. 23, 2000 entitled "Fuel Cell Apparatus and Method Thereof", and claims priority thereto under 35 USC 120.

The United States Government has rights in this invention pursuant to Contract No. W-7405-ENG48, between the United States Department of Energy and the University of California for the operation of Lawrence Livermore National Laboratory.

BACKGROUND

High temperature, molten electrolyte, electrochemical cells have been shown to be an efficient method of producing energy particularly when the fuel source is hydrogen gas. Carbon as a fuel source in electrochemical cells has been explored. Efficiencies of various carbon sources have been calculated based on half-cell data and have consistently been low, e.g., 50% or less.

SUMMARY OF THE INVENTION

Aspects of the invention include a high temperature, molten electrolyte electrochemical cell comprising ash-free, turbostratic carbon particles.

Another aspect of the invention includes a high temperature, molten electrolyte, electrochemical cell for directly converting a carbon fuel to electrical energy, the electrochemical cell comprising a cathode compartment having an oxygen-containing gas and a molten electrolyte; an anode compartment having a slurry comprising the molten electrolyte and carbon particles entrained in the molten electrolyte; and an electron insulating, ion conducting, porous ceramic separator between the cathode compartment and the anode compartment.

Another aspect of the invention includes a high temperature, molten electrolyte electrochemical cell for directly converting a carbon fuel to electrical energy, the electrochemical cell comprising a cathode compartment formed by a housing comprising non-porous, inert material having a gas inlet and outlet, an oxygen-containing gas, a molten electrolyte, and a cathode current collector; an anode compartment having an inlet, an anode current collector, and a slurry comprising the molten electrolyte and carbon particles entrained in the molten electrolyte; and an electron insulating, ion conducting, porous ceramic separator between the cathode compartment and the anode compartment, the porous ceramic separator capable of allowing transport of ions produced in the cathode compartment to the slurry.

Another aspect of the invention includes a method for producing electrical energy, the method comprising the steps of heating an electrochemical cell containing a carbon fuel entrained in an electrolyte to an operating temperature; producing carbonate ions by bringing an oxygen-containing gas in contact with a cathode current collector wetted with molten carbonate; transporting the carbonate ions through a porous ceramic separator to an anode current collector; reacting the carbonate ions with the carbon fuel; and collecting the electrical energy produced through the anode current collector.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE EMBODIMENTS

Figure 1:
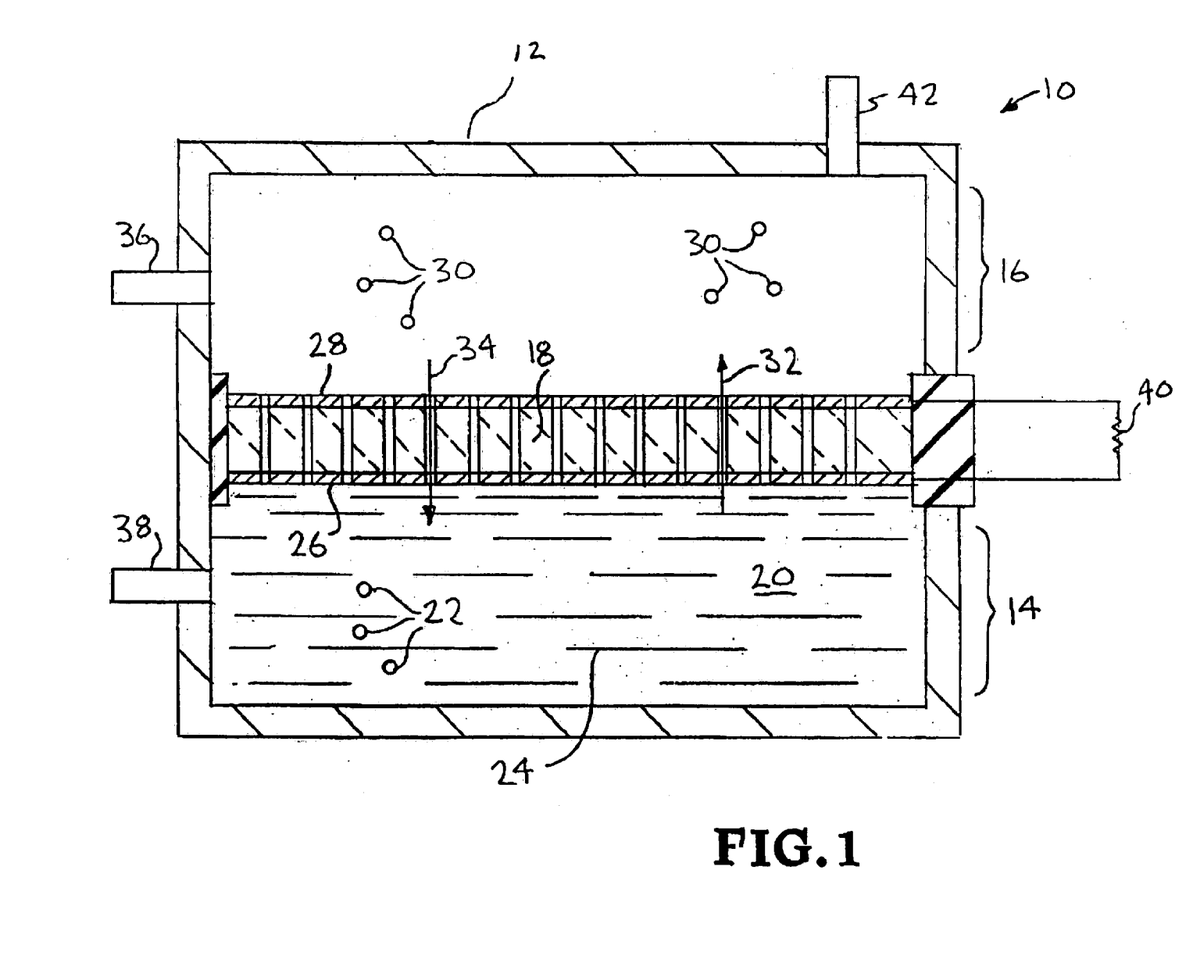
FIG. 1 is a cross-sectioned view of an embodiment of an electrochemical cell.
Figure 2A:
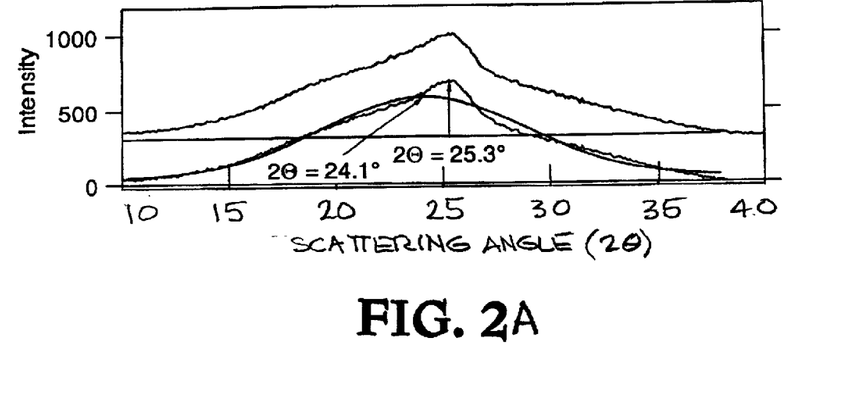
FIG. 2A is X-ray diffraction spectra of carbon sample A.
Figure 2B:
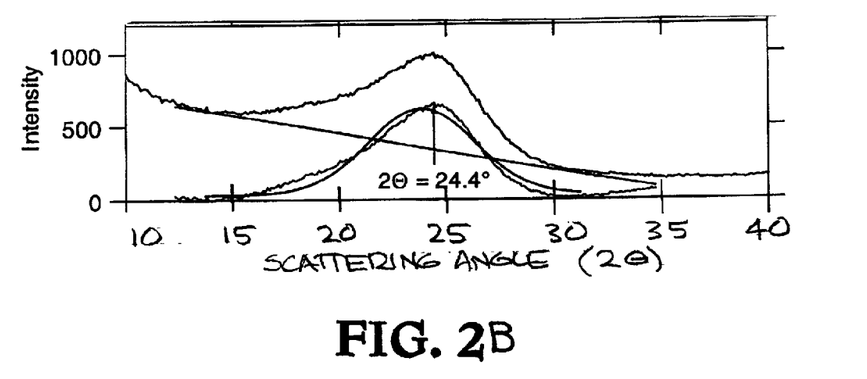
FIG. 2B is X-ray diffraction spectra of carbon sample B.
Figure 2C:
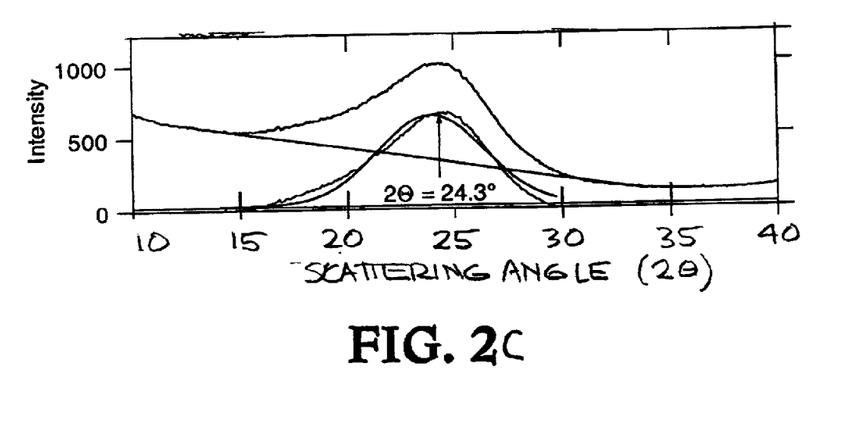
FIG. 2C is X-ray diffraction spectra of carbon sample C.
Figure 2D:
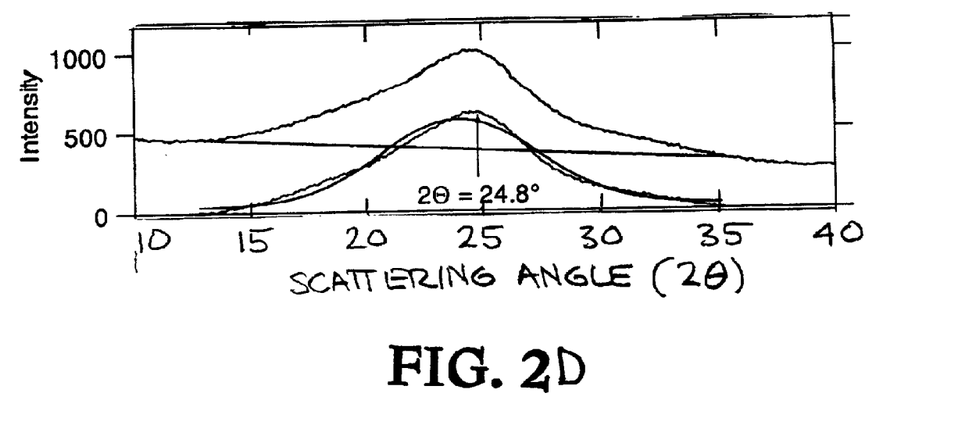
FIG. 2D is X-ray diffraction spectra of carbon sample D.
Figure 2E:
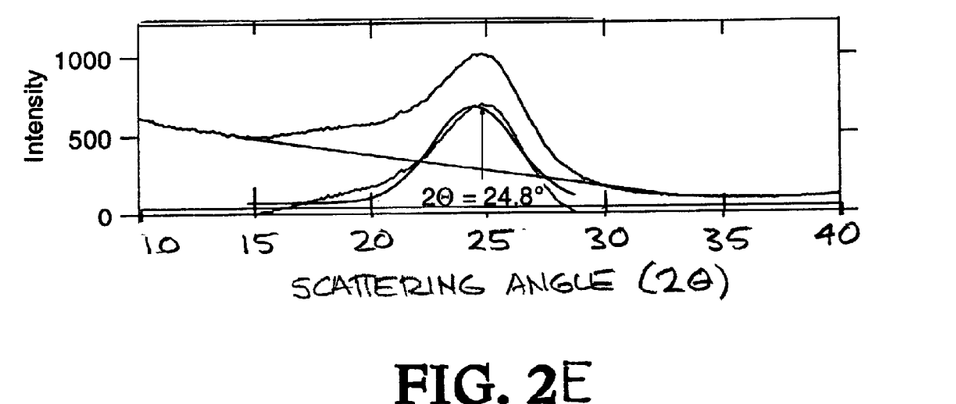
FIG. 2E is X-ray diffraction spectra of carbon sample E.
Figure 2F:
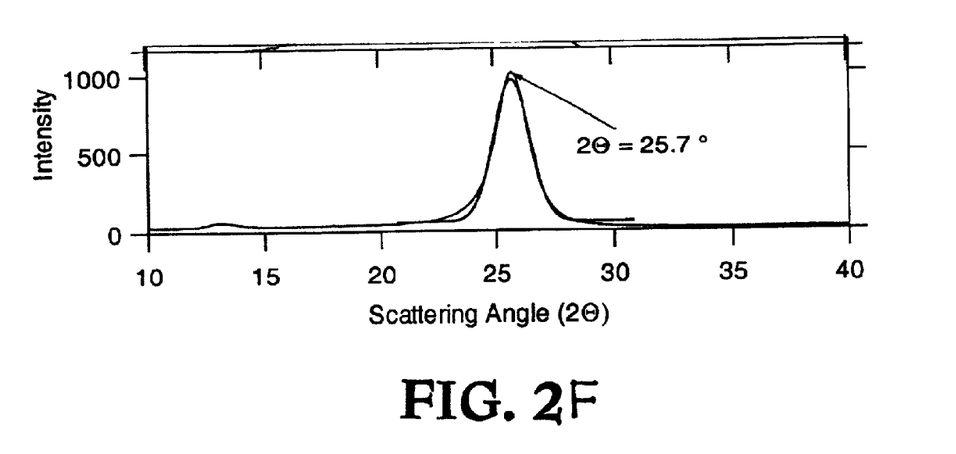
FIG. 2F is X-ray diffraction spectra of carbon sample F.

A high temperature, molten electrolyte electrochemical cell shown in FIG. 1 can operate as either a fuel cell or a battery. Fuel cells are characterized by having a fixed cell hardware that is capable of consuming fuel supplied to the cell from an external source; the rated power and energy capacity of fuel cells are, by definition, fully independent parameters. Batteries, in contrast, have their electrochemical reactants supplied in advanced of discharge and are limited in power and energy content simultaneously by the initial charge.

Referring to FIG. 1, the electrochemical cell 10 comprises a housing 12 that includes therein an anode compartment 14, a cathode compartment 16, and a porous ceramic separator 18 between the anode and cathode compartments. Anode compartment 14 is comprised of a slurry 20 containing a mixture of carbon fuel particles 22 and an electrolyte 24 and an anode current collector 26. Cathode compartment 16 is comprised of a cathode current collector 28, and an oxygen-containing gas 30.

FIG. 1 shows the cell in a rectangular shape wherein the compartments of the cell are arranged vertically. Other shapes of the cell such as cylindrical and other configurations such as horizontal can perform equally well.

The housing 12 can be selected from any non-porous, inert material, such as, a non-reactive ceramic material, e.g., alumina. For large-scale commercial apparatuses, a metal alloy such as stainless steel can be used. To further improve the lifetime of the housing material, the alloy can be coated with a non-reactive material, such as a ceramic, a metal oxide film, or the like.

Electrolyte 24 comprises metal carbonates. A single metal carbonate or a combination of metal carbonates may be used, in particular, mixtures of low melting alkali and/or alkaline earth carbonates. Commonly used carbonates are mixtures of $Li_2CO_3$, $K_2CO_3$, and/or $Na_2CO_3$. The eutectic mixture of 38% $Li_2CO_3$, 62% $K_2CO_3$ (molar ratio) as electrolyte 24 is highly effective.

A porous metal structure can serve as anode current collector 26. Anode current collector 26 can comprise a mesh, grid, felt, screen, sintered frit, or other similar electronically-conductive matrix that allows effective contact with and transport of the carbon fuel, salt and $CO_2$ product. In addition, anode current collector 26 comprises any metal or metalloid (e.g., graphite, highly graphitized carbon or glassy carbon), that cannot melt at the operating temperature of the cell and is stable against corrosion in the molten carbonate salt. Metalloids such as those listed above are particularly effective if sulfur-bearing carbons are used. Ni felt, gold or platinum mesh or a metalloid foam or sponge can be employed as anode current collector 26. Cell 10 effectively performs at a ratio where the surface area of anode current collector 26 to the volume of slurry 20 is less than about 1 cm.

Porous ceramic separator 18 can comprise a cloth, felt, fabric, porous planar plate, porous tubular plate, or other similar structure. Porous ceramic separator 18 is constructed to be capable of transporting dissolved $CO_2$ 32 and carbonate ions 34 between anode compartment 14 and the cathode compartment 16. Separator 18 can comprise a non-reactive metal oxide such as $ZrO_2$, MgO, $LiAlO_2$, CaO, $Al_2O_3$, rare earth oxides, or other similar materials. $ZrO_2$ cloth of about 0.4–1.7 mm thickness or a porous $Al_2O_3$ crucible of about 1.5 mm wall thickness are effective as separator 18.

Cathode current collector 28 normally includes a metal that is in the form of a mesh, grid, felt, screen, sintered frit or other similar structure. Cathode current collector 28 is positioned in contact with an oxygen-containing gas 30 while concurrently in contact with the molten electrolyte 24. The combination of a molten electrolyte in the presence of oxygen creates a very corrosive environment and thus cathode current collector 28 can beneficially contain a corrosion resistant metal such as Ni, Au, Ag, Pt, Pd, Cu, Co, stainless steel, a corrosion resistant alloy, conductive oxides, such as NiO, Li $CoO_2$, $LiFeO_2$, $Li_xNi_{1-x}O$ or other similar material.

An oxygen-containing gas 30 is introduced to the cell through an inlet 36. The oxygen-containing gas 30 comprises air, but theoretically can be any inert gas that contains oxygen or even pure oxygen. Air performs well and is inexpensive.

Table 1 compares various structural parameters and performances of six different carbon fuels. A is pyrolyzed acetylene, B, C and D are pyrolyzed oil products produced from a furnace black process, and E is pyrolyzed methane from a thermal black process. All are provided by Engineered Carbons Incorporated of Borger, Tex. F is petroleum coke "as received" from Superior Graphite Company of Chicago, Ill. No milling or further calcining steps were performed on it. Carbon particles can be extremely fine, e.g., less than 1 micron in size, or comprised of aggregates of large numbers of such fines. Primary particle size and aggregate size are determined by transmission electron microscopy, surface area is measured by BET ($N_2$) adsorption, nanostructural order is determined by X-ray diffraction, and chemical reactivity to air oxidation is determined by thermal gravimetric analysis. The d(002) represents the expanded lattice spacing and the $L_c$ refers to the short crystalline dimension perpendicular to basal plane.

TABLE 1

| Sample | d(002) spacing (nm) | $L_c$ (nm) | Surface Area ($m^2$/g) | Temp. at 80% Decomp. (° C.) | Current density at 0.8 V (mA/$cm^2$) | Temp. at Current density meas. (° C.) |
|---|---|---|---|---|---|---|
| A | 0.369 | 1.7 | 60 | 731 | 103 | 850 |
| B | 0.374 | 2.9 | 75 | 819 | 30 | 810 |
| C | 0.374 | 2.9 | 120 | 749 | 15 | 740 |
| D | 0.371 | 2.3 | 24 | 789 | 7 | 820 |
| E | 0.363 | 4.3 | 9 | 796 | 6 | 740 |
| F | 0.347 | 11.7 | 0.4 | 899 | 8 | 770 |

Table 1 shows that the carbon particles studied are turbostratic, that is, they exhibit small $L_c$ values and expanded d (002) spacing as compared to graphite at 0.3354 nm. Furthermore, high turbostraticity, as well as large surface area, correlate with electrochemical reactivity.

FIGS. 2A-2F show the X-ray diffraction spectra of the six carbon samples A through F.

Another important feature of the carbon particles is whether or not they are "ash-free". Ash refers to any impurities present in the carbon particles. For instance, silica and metal oxides are examples of ash. Such impurities can be found in hydrocarbons before pyrolysis and are carried over into the carbon product of the pyrolysis. Carbon-containing samples that provide highly effective results are obtained from the pyrolysis of hydrocarbons that are substantially pure, i.e., greater than or equal to 95% carbon by weight. The carbon particles produced from any group of hydrocarbons should be expected to have relatively high efficiencies in the electrochemical cells disclosed herein. Examples include, aliphatic hydrocarbons such as alkanes, alkenes and alkynes, aromatic hydrocarbons such as benzene and toluene, including multi-ring aromatic compounds such as naphthalene, and mixtures of the above named hydrocarbons such as natural gas. Pyrolysis products from substantially pure (greater than or equal to 95% carbon by weight) petroleum coke and substantially pure (greater than or equal to 95% carbon by weight) petroleum oil, cracking products or distillates can also be used effectively. It is preferable that carbons be of large specific surface area and should have been subjected to a minimum of thermal treatments that would result in graphitization or crystallization.

The cell shown in FIG. 1 may be operated at temperatures between 500° C. and 900° C. Greater ionic mobility and improved open circuit potential accompany increases in temperature. Ranges between 740° C. and 850° C. are effective. The cell can be assembled at room temperature each time an experiment is conducted.

Anode compartment 14 is formed by positioning slurry 20 (a mixture of electrolyte 24 and carbon fuel particles 22) in the bottom of cell 10. Carbon fuel particles 22 may be introduced to cell 10 through an inlet 38. Anode current collector 26 is positioned on top of slurry 20. Porous ceramic separator 18 is placed on top of anode current collector 26, and cathode current collector 28 is positioned on top of separator 18. Electrolyte 24 will become molten once the cell is heated to the operating temperature. Keeping a ratio of the surface area of anode current collector 26 to the volume of slurry 20 of less than about 1 cm can substantially reduce the loss of carbon to chemical corrosion by $CO_2$ that may be present in anode compartment 14. Such $CO_2$-caused corrosion, based upon the Boudouard reaction, may be represented by $C+CO_2=2CO$.

A feature of the invention is that separator 18 be impermeable to gas bubbles and/or completely wetted by electrolyte to avoid direct chemical reaction of the carbon fuel with oxygen from cathode compartment 16. Furthermore, separator 18 should be of sufficient thickness to prevent electrical shorting. It is desirable that separator 18 be thin enough to minimize resistive losses through the electrolyte. When saturated with electrolyte 24, separator 18 is dual functional, i.e., it is both ion-conducting and electron insulating. In a heated cell a molten electrolyte 24 can migrate from anode compartment 14 through separator 18 such that separator 18 is saturated with molten electrolyte 24 allowing transport of dissolved $CO_2$ 32 and carbonate ions 34 between anode compartment 14 and cathode compartment 16.

Cathode current collector 28 is positioned on separator 18 such that molten electrolyte 24 is allowed to contact the surface on one side while the other side is concurrently in contact with oxygen-containing gas 30. Oxygen-containing gas 30 can be introduced to cell 10 through an inlet 36. As oxygen-containing gas 30 contacts cathode current collector 28, the cathodic half reaction $4e^- + O_2 + 2CO_2 = 2CO_3^{2-}$ occurs, carbonate ions 34 migrate through porous ceramic separator 18 coming in contact with anode current collector 26 where the anodic half reaction $C + 2CO_3^{2-} = 3CO_2 + 4e^-$ occurs and energy produced by the cell is collected by a load 40. $CO_2$ produced by the net reaction $C + O_2 = CO_2$ can be removed from cell 10 through an outlet 42.

Rates as high as 100 mA/cm$^2$ at 0.8 V and 200 mA/cm$^2$ at 0.5 V can be achieved. Commercial systems can be designed in which several electrochemical cells may be placed in series and/or parallel. Uses include primary batteries, fuel batteries with replaceable carbon electrodes, and carbon/oxygen (air) fuel cells.

Applicants have tested six different carbon fuel samples in a small electrochemical cell suitable for laboratory testing. Several embodiments of the electrochemical cell were used. Differences between the embodiments include the chemical composition, structure, thickness and shape of the porous ceramic separator 18. Porous ceramic separators were either $ZrO_2$ cloth, thickness of 0.4–1.7 mm, or porous $Al_2O_3$ crucibles. The ceramic crucible separator has an inherently greater IR drop but is more rigid; the fabric separator is thin typically 0.25 mm, and has a proportionately lower IR drop. Thus higher power is obtained with the use of the thin fabric separator. Anode compartment 14 was typically loaded with 10–25 wt % carbon fuel particles 22 in electrolyte 24 typically $Li_2CO_3/K_2CO_3$ (46.6/53.4 wt %, 38/62 mole %) carbonate salt. Cathode compartment 16 was supplied with variable ratios and flow rates of air/$CO_2$. Anode current collectors 26 used were 1–20 cm$^2$ in size, made of nickel, gold or platinum mesh or foam. Cathode current collectors 28 used were 1–20 cm$^2$ in size and made of either Au or Pt mesh. Polarization curves were measured in the 700–900 degrees Celsius range, and power was also generated over intervals in excess of 12 hours at steady state.

EXAMPLES

Electrochemical reactivity of sample B was tested in the cell configuration described below. Experimental data for electrochemical reactivity of sample B is shown by the solid diamonds and triangles in FIG. 3. The cell which was heated in a tubular furnace at about 810° C. for about 6 hours comprises: a solid alumina outer crucible with a cap containing holes for an alumina tube that introduced a mixture of $CO_2/O_2$ in the ratio of about 3:1 and an alumina tube containing a thermocouple; about a 1.5 mm thick porous alumina inner crucible (separator) with a cap containing holes for an alumina tube that introduced argon, a gold $O_2/CO_2$ reference electrode, and a thermocouple; a cathode comprising about 12 cm$^2$ platinum mesh wrapped around near the base of the crucible and attached to platinum wire; an anode comprising about 21.4 cm$^2$ platinum mesh attached to platinum wire pressed into the inside of the porous crucible and connected to a lead made of a piece of wire. A carbon/carbonate salt mixture (about 6 g carbon powder, about 20 g carbonate salts in a molar ratio of about 38% $Li_2CO_3$, 62% $K_2CO_3$) was loaded into the central compartment of the porous crucible and about 20 g of carbonate salts were added to the outer crucible to promote wetting of the porous crucible.

Electrochemical reactivity of sample B was tested in the cell configuration described below. Experimental data for electrochemical reactivity of sample B is shown by the solid diamonds and triangles in FIG. 3. The cell which was heated in a tubular furnace at a temperature between about 810° C. and about 850° C. for about 6 hours comprises: a small solid alumina crucible loaded with a carbon/carbonate salt mixture (about 1.25 g carbon powder, about 5 g carbonate salts in a molar ratio of about 38% $Li_2CO_3$, 62% $K_2CO_3$), a flat circular nickel mesh anode connected to a wire lead, a zirconia fabric separator with a thickness between about 0.38 mm and about 0.76 mm, and a gold mesh cathode connected to a gold strip lead. The gold cathode was pressed into the surface of the separator. A mixture of air and $CO_2$ in the ratio of about 2.5 to 1 was introduced through an alumina tube to the surface of the cathode, and thermocouples were used to measure the temperature in the vicinity of the cathode.

Figure 5:
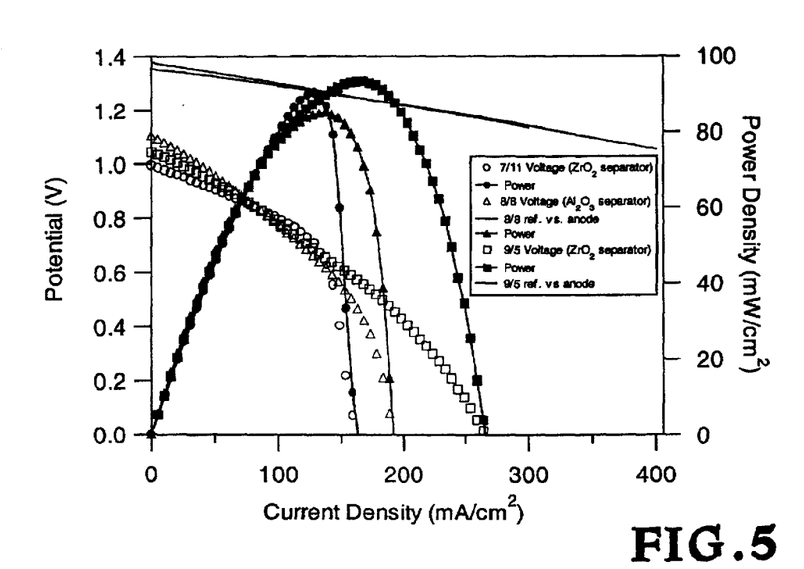
FIG. 5 shows the results of one experiment with sample A in one cell embodiment and two experiments with sample A in a second cell embodiment.

Electrochemical reactivity of sample A was tested twice in the cell configuration described below. Experimental data for electrochemical reactivity of sample A measured in the first test using the cell configuration described below is shown in FIG. 5 and identified as 7/11 voltage ($ZrO_2$ separator). The cell which was heated in a tubular furnace at about 850° C. for about 48 hours comprises: a small solid alumina crucible loaded with a carbon/carbonate salt mixture (about 1.25 g carbon powder, about 5 g carbonate salts in a molar ratio of about 38% $Li_2CO_3$, 62% $K_2CO_3$), a flat circular nickel mesh anode connected to a wire lead, a zirconia fabric separator with a thickness between about 0.38 mm and about 0.76 mm, and a gold mesh cathode connected to a gold strip lead. The gold cathode was pressed into the surface of the separator. Air was introduced through an alumina tube to the surface of the cathode, and thermocouples were used to measure the temperature in the vicinity of the cathode.

Experimental data for electrochemical reactivity of sample A measured in the second test using the cell configuration described below is shown in FIG. 5 and identified as 9/5 voltage ($ZrO_2$ separator). The cell which was heated in a tubular furnace at about 850° C. for about 5 hours comprises: a small solid alumina crucible loaded with a carbon/carbonate salt mixture (about 1.75 g carbon powder, about 5 g carbonate salts in a molar ratio of about 38% $Li_2CO_3$, 62% $K_2CO_3$), a flat circular nickel mesh anode connected to a wire lead, a zirconia fabric separator with a thickness between about 0.38 mm and about 0.76 mm, and a gold mesh cathode connected to a gold strip lead. The gold cathode was pressed into the surface of the separator. Air was introduced through an alumina tube to the surface of the cathode, and thermocouples were used to measure the temperature in the vicinity of the cathode.

Electrochemical reactivity of sample A was tested in the cell configuration described below. Experimental data for electrochemical reactivity of sample A using the cell configuration described below is shown in FIG. 5 and identified as 8/8 voltage ($Al_2O_3$ separator). The cell which was heated in a tubular furnace at about 850° C. for about 8 hours comprises: a solid alumina outer crucible with a cap containing holes for an alumina tube that introduced air and an alumina tube containing a thermocouple; about a 1.5 mm thick porous alumina inner crucible (separator) with a cap containing holes for an alumina tube that introduced argon, a gold $O_2/CO_2$ reference electrode, and a thermocouple; a cathode comprising about 12 $cm^2$ platinum mesh wrapped around near the base of the crucible and attached to platinum wire; an anode comprising about 21.4 $cm^2$ platinum mesh attached to platinum wire pressed into the inside of the porous crucible and connected to a lead made of a piece of wire. A carbon/carbonate salt mixture (about 5 g carbon powder, about 20 g carbonate salts in a molar ratio of about 38% $Li_2CO_3$, 62% $K_2CO_3$) was loaded into the central compartment of the porous crucible and about 20 g of carbonate salts were added to the outer crucible to promote wetting of the porous crucible.

Results of the three tests of electrochemical reactivity of sample A illustrated in FIG. 5 show that a cell voltage of 0.8 V at 100 $mA/cm^2$ is reproducible, while behavior at higher current densities varies depending on the cell configuration used.

Discussion of Data

Figure 3:
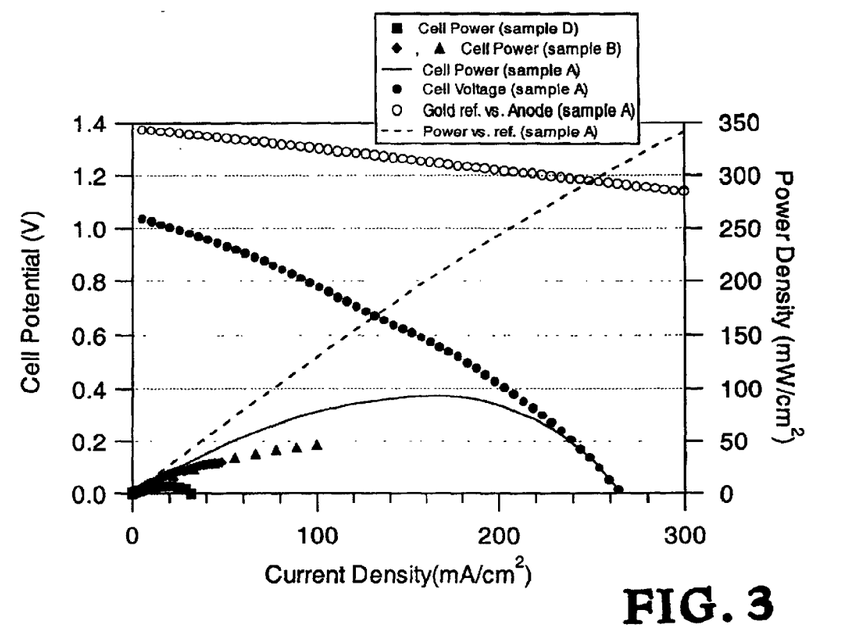
FIG. 3 is a plot of power density and cell potential versus current density showing the cell power of carbon sample B in two different cell configurations.

FIG. 3 shows power density curves, anode vs. cathode, for B and E reach very low peak powers. Cell polarization for A shows 100 $mA/cm^2$ at 0.8 V, and a peak power near 100 $mW/cm^2$, while reference vs. anode for A shows even less polarization, and power vs. reference for A suggests potential power generation at >300 $mW/cm^2$.

Figure 4A:
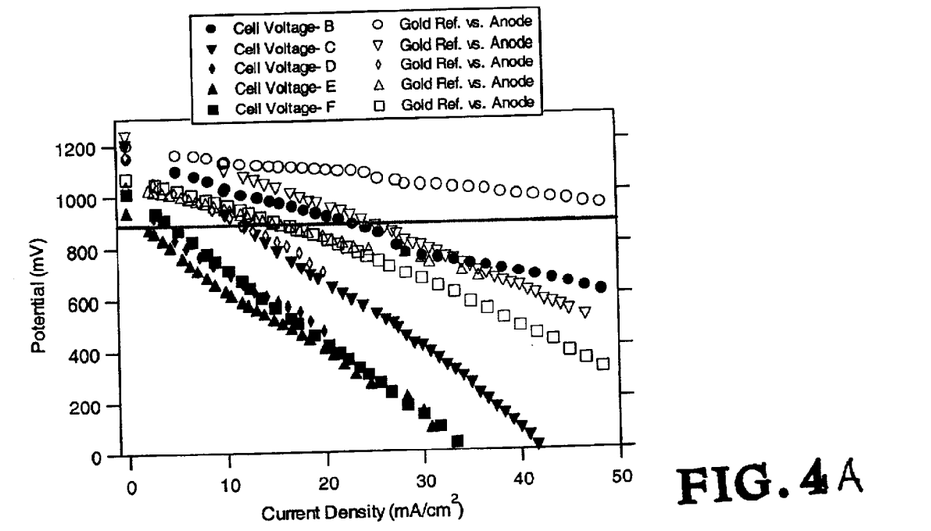
FIG. 4A shows cell and half-cell polarization.
Figure 4B:
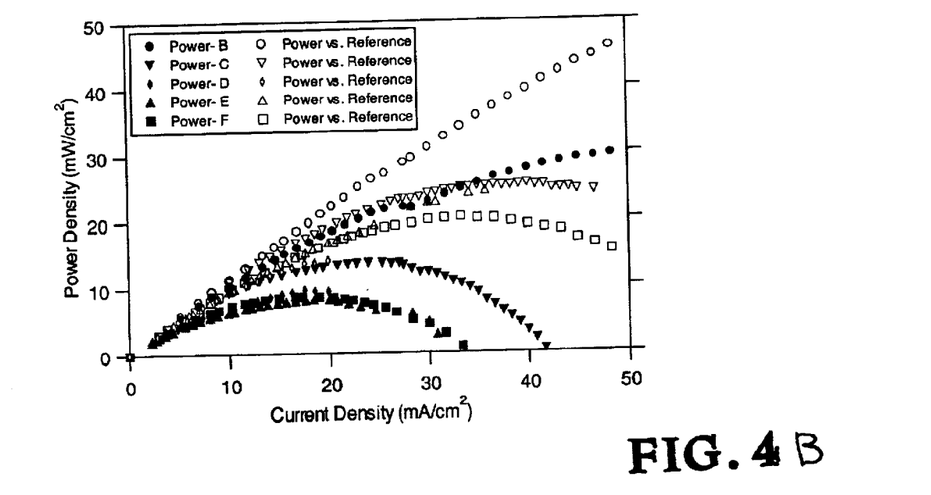
FIG. 4B shows cell and half-cell power.

FIG. 4A shows cell polarization (anode vs. cathode) of samples B, C, D, E, and F, as well as polarization vs. a gold reference electrode (half-cell data). FIG. 4B shows cell power (anode vs. cathode) and power that could be generated if cathode polarization matched that of the reference.

FIG. 5 shows the cell power measured for sample A in two different cell configurations, thus illustrating that the two cell configurations used to collect data for the six carbon samples analyzed are comparable.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A high temperature, molten electrolyte electrochemical cell comprising:
ash-free, turbostratic carbon particles, wherein said electrochemical cell is a fuel cell.

2. A high temperature, molten electrolyte electrochemical cell for directly converting a carbon fuel to electrical energy, the electrochemical cell comprising:
a cathode compartment having an oxygen-containing gas and a molten electrolyte;
an anode compartment having a slurry comprising said molten electrolyte and carbon particles entrained in said molten electrolyte; and
an electron insulating, ion conducting, porous ceramic separator between said cathode compartment and said anode compartment.

3. The electrochemical cell in claim 2, wherein said electrochemical cell is a battery.

4. The electrochemical cell in claim 2, wherein said electrochemical cell is a fuel cell.

5. The electrochemical cell in claim 2, wherein the oxygen-containing gas consists essentially of elemental, diatomic oxygen.

6. The electrochemical cell in claim 2, wherein the oxygen-containing gas comprises air.

7. The electrochemical cell in claim 2, wherein the molten electrolyte comprises metal carbonates.

8. The electrochemical cell in claim 2, wherein the molten electrolyte comprises a mixture of one or more components selected from the group consisting of $Li_2CO_3$, $K_2CO_3$, and $Na_2CO_3$.

9. The electrochemical cell in claim 2, wherein the molten electrolyte comprises the mole ratio of 38% $Li_2CO_3$/62% $K_2CO_3$.

10. The electrochemical cell in claim 2, wherein said carbon particles have an x-ray diffraction d(002) line that is greater than about 0.34 nanometers.

11. The electrochemical cell in claim 2, wherein said carbon particles are selected from the group consisting of pyrolysis products of substantially pure hydrocarbons, pyrolysis products substantially pure petroleum coke and pyrolysis products of substantially pure petroleum oil or distillates.

12. The electrochemical cell in claim 11, wherein the substantially pure hydrocarbon contains an alkyne.

13. The electrochemical cell in claim 11, wherein the substantially pure hydrocarbon contains is acetylene.

14. The electrochemical cell in claim 2, wherein the porous ceramic separator is saturated with the molten electrolyte.

15. The electrochemical cell in claim 2, wherein the porous ceramic separator is a non-reactive metal oxide selected from the group consisting of $ZrO_2$, MgO, $LiAlO_2$, CaO, $Al_2O_3$, rare earth oxides, and combinations thereof.

16. The electrochemical cell in claim 14, wherein the non-reactive metal oxide is constructed in the form of a cloth, felt, fabric, porous planar plate, or porous tubular plate.

17. The electrochemical cell in claim 2, wherein the porous ceramic separator is less than 2 mm thick and is impermeable to bubbles when wetted.

18. A high temperature, molten electrolyte electrochemical cell for directly converting a carbon fuel to electrical energy, the electrochemical cell comprising:
a cathode compartment formed by a housing comprising non-porous, inert material having a gas inlet and a gas outlet, an oxygen-containing gas, a molten electrolyte, and a cathode current collector;
an anode compartment having an inlet, an anode current collector, and a slurry comprising said molten electrolyte and a plurality of carbon particles entrained in said molten electrolyte; and
an electron insulating, ion conducting, porous ceramic separator between said cathode compartment and said anode compartment, said porous ceramic separator capable of allowing transport of ions produced in said cathode compartment to said slurry.

19. The electrochemical cell in claim 18, wherein said electrochemical cell is a battery.

20. The electrochemical cell in claim 18, wherein said electrochemical cell is a fuel cell.

21. The electrochemical cell in claim 18, wherein the non-porous, inert material contains one or more materials selected from the group consisting of stainless steel, stainless steel coated with a non-reactive ceramic material, stainless steel coated with a non-reactive metal oxide film, metal, ceramic.

22. The electrochemical cell in claim 18, wherein the oxygen-containing gas consists essentially of elemental, diatomic oxygen.

23. The electrochemical cell in claim 18, wherein the oxygen-containing gas comprises air.

24. The electrochemical cell in claim 18, wherein the molten electrolyte comprises a carbonate.

25. The electrochemical cell in claim 18, wherein the molten electrolyte comprises one or more components selected from the group consisting of $Li_2CO_3$, $K_2CO_3$, and $Na_2CO_3$.

26. The electrochemical cell in claim 18, wherein the molten electrolyte comprises the mole ratio of 38% $Li_2CO_3$/62% $K_2CO_3$.

27. The electrochemical cell in claim 18, wherein the cathode current collector is a metal selected from the group consisting of Ni, Au, Ag, Pt, Pd, Cu, Co, alloys thereof, and Fe alloys thereof.

28. The electrochemical cell in claim 18, wherein the cathode current collector comprises stainless steel.

29. The electrochemical cell in claim 18, wherein said cathode current collector is a grid, felt, screen, foam, mesh or sintered frit.

30. The electrochemical cell in claim 18, wherein the cathode current collector is positioned such that it is in contact with the oxygen-containing gas and is at least partially in contact with the molten electrolyte.

31. The electrochemical cell in claim 18, wherein the cathode current collector is positioned such that it is in contact with the oxygen-containing gas and is in contact with the molten electrolyte, but less than fully saturated.

32. The electrochemical cell in claim 18, wherein the anode current collector comprises a porous metal structure that will not melt at the operating temperature of the cell.

33. The electrochemical cell in claim 32, wherein the porous metal structure comprises a grid, felt, screen, foam, mesh, sponge or sintered frit.

34. The electrochemical cell in claim 18, wherein the anode current collector comprises a porous metalloid structure that will not melt at the operating temperature of the cell.

35. The electrochemical cell in claim 34, wherein the porous metalloid structure comprises a grid, felt, screen, foam, mesh, sponge or sintered frit.

36. The electrochemical cell in claim 18, wherein the ratio of the surface area of the anode current collector to the volume of the slurry is less than 1 cm.

37. The electrochemical cell in claim 18, wherein said carbon particles have an x-ray diffraction d(002) line that is greater than about 0.34 nanometers.

38. The electrochemical cell in claim 18, wherein said carbon particles have a maximum diameter of less than about one micrometer.

39. The electrochemical cell in claim 18, wherein said carbon particles are selected from the group consisting a pyrolysis product of a substantially pure hydrocarbon, a pyrolysis product of a substantially pure petroleum coke, and a pyrolysis product of a substantially pure petroleum oil or distillate.

40. The electrochemical cell in claim 18, wherein the substantially pure hydrocarbon contains an alkyne.

41. The electrochemical cell in claim 18, wherein the substantially pure hydrocarbon contains is acetylene.

42. The electrochemical cell in claim 18, wherein the porous ceramic separator comprises a non-reactive metal oxide that is saturated with the molten electrolyte.

43. The electrochemical cell in claim 42, wherein the non-reactive metal oxide is selected from the group consisting of $ZrO_2$, MgO, $LiAlO_2$, CaO, $Al_2O_3$, rare earth oxides, and combinations thereof.

44. The electrochemical cell in claim 42, wherein the non-reactive metal oxide is a cloth, felt, fabric, porous planar plate, or porous tubular plate.

45. The electrochemical cell in claim 18, wherein the porous ceramic separator is less than about 2 mm thick and is impermeable to bubbles when wetted.

46. A method for producing electrical energy comprising the steps of:

heating an electrochemical cell containing a carbon fuel entrained in an electrolyte to an operating temperature causing the electrolyte to become molten, said electrolyte containing at least one carbonate;

producing carbonate ions by bringing an oxygen-containing gas in contact with a cathode current collector wetted with the molten electrolyte;

transporting said carbonate ions through a porous ceramic separator to an anode current collector causing said carbonate ions to react with said carbon fuel; and collecting said electrical energy produced through said anode current collector.

47. The method in claim 46, further comprising the step of:

entraining a carbon fuel in an electrolyte.

48. The method in claim 46, further comprising the step of:

pyrolyzing a source of carbon fuel wherein said source is selected from the group consisting of substantially pure petroleum coke, substantially pure petroleum oils or distillates, and substantially pure hydrocarbons.

49. The method in claim 46, wherein the substantially pure hydrocarbon contains an alkyne.

50. The electrochemical cell in claim 46, wherein the substantially pure hydrocarbon contains is acetylene.

51. The method in claim 46, wherein said electrochemical cell is operated as a battery.

52. The method in claim 46, wherein said electrochemical cell is operated as a fuel cell.

53. The method in claim 46, wherein said carbon particles are selected from the group consisting of a pyrolysis product of a substantially pure hydrocarbon, substantially pure petroleum coke, and substantially petroleum pure oil, petroleum cracking products or petroleum distillates.

54. The method in claim 46, wherein the substantially pure hydrocarbon is acetylene.

55. The method in claim 46, wherein said carbon particles have an x-ray diffraction d(002) line that is greater than about 0.34 nanometers.

56. The method in claim 46, wherein the molten electrolyte comprises a mixture of one or more components selected from the group consisting of $Li_2CO_3$, $K_2CO_3$, and $Na_2CO_3$.

57. The method in claim 46, wherein the molten electrolyte comprises the mole ratio of 38% $Li_2CO_3$/62% $K_2CO_3$.

58. The method in claim 46, wherein the operating temperature is between about 500 degrees C. and about 900 degrees C.

59. The method in claim 46, wherein the oxygen-containing gas consists essentially of elemental, diatomic oxygen.

60. The method in claim 46, wherein the oxygen-containing gas comprises air.

61. The method in claim 46, wherein the cathode current collector is a porous metal selected from the group consisting of Ni, Au, Ag, Pt, Pd, Cu, Co, alloys thereof, and Fe alloys thereof.

62. The method in claim 46, wherein the cathode current collector comprises stainless steel.

63. The method in claim 46, wherein the cathode current collector is positioned in contact with the oxygen-containing gas and is at least partially in contact with the molten electrolyte.

64. The method in claim 46, wherein the cathode current collector is positioned in contact with the oxygen-containing gas and is at least partially in contact with the molten electrolyte, but less than saturated.

65. The method in claim 46, wherein the porous ceramic separator comprises a non-reactive metal oxide that is saturated with the molten electrolyte.

66. The method in claim 65, wherein the non-reactive metal oxide is selected from the group consisting of $ZrO_2$, $MgO$, $LiAlO_2$, $CaO$, $Al_2O_3$, rare earth oxides, and combinations thereof.

67. The method in claim 65, wherein the non-reactive metal oxide comprises a cloth, felt, fabric, planar plate, or tubular plate.

68. The method in claim 46, wherein the porous ceramic separator is less than about 5 nm thick and impermeable to bubbles when wetted.

69. The method in claim 46, wherein the porous ceramic separator is both electron insulating and ion conducting.

70. The method in claim 46, wherein the anode current collector is a porous metal structure that will not melt at the operating temperature of the cell.

71. The method in claim 70, wherein the porous metal structure comprises a grid, felt, screen, foam, sponge or sintered frit.

72. The method in claim 46, wherein the anode current collector is a porous metalloid structure that will not melt at the operating temperature of the cell.

73. The method in claim 72, wherein the porous metalloid structure comprises a grid, felt, screen, foam, sponge or sintered frit.

74. The method in claim 46, wherein the ratio of anodic surface area to the volume of the slurry is less than about 1 cm.

75. The method in claim 46, further comprising the step of:

connecting two or more electrochemical cells together to operate in series.

76. The method in claim 46, further comprising the step of:

connecting two or more electrochemical cells together to operate in parallel.

77. The method in claim 46, further comprising the step of:

connecting the electrochemical cell to a load.

* * * * *